(12) United States Patent
Yoshikawa et al.

(10) Patent No.: US 11,494,975 B2
(45) Date of Patent: Nov. 8, 2022

(54) METHOD FOR ANALYZING THREE-DIMENSIONAL MODEL AND DEVICE FOR ANALYZING THREE-DIMENSIONAL MODEL

(71) Applicant: Panasonic Intellectual Property Corporation of America, Torrance, CA (US)

(72) Inventors: Satoshi Yoshikawa, Hyogo (JP); Toshiyasu Sugio, Osaka (JP); Toru Matsunobu, Osaka (JP); Tatsuya Koyama, Kyoto (JP); Masaki Fukuda, Osaka (JP); Shunsuke Yasugi, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 146 days.

(21) Appl. No.: 17/072,454

(22) Filed: Oct. 16, 2020

(65) Prior Publication Data
US 2021/0035355 A1 Feb. 4, 2021

Related U.S. Application Data

(63) Continuation of application No. PCT/JP2019/024341, filed on Jun. 19, 2019.
(Continued)

(51) Int. Cl.
*G06T 15/20* (2011.01)
*G06T 7/194* (2017.01)
(Continued)

(52) U.S. Cl.
CPC .......... *G06T 15/205* (2013.01); *G06T 5/005* (2013.01); *G06T 5/50* (2013.01); *G06T 7/194* (2017.01);
(Continued)

(58) Field of Classification Search
None
See application file for complete search history.

(56) References Cited

U.S. PATENT DOCUMENTS

| 10,789,723 B1* | 9/2020 | Kopf ...................... G06T 17/20 |
| 2018/0205926 A1* | 7/2018 | Mogalapalli ......... H04N 13/122 |

(Continued)

FOREIGN PATENT DOCUMENTS

JP     2002-165200     6/2002

OTHER PUBLICATIONS

International Search Report (ISR) dated Sep. 10, 2019 in International (PCT) Application No. PCT/JP2019/024341.
(Continued)

*Primary Examiner* — James A Thompson
(74) *Attorney, Agent, or Firm* — Wenderoth, Lind & Ponack, L.L.P.

(57) ABSTRACT

A method for analyzing a three-dimensional model of an object which includes: obtaining the three-dimensional model generated based on images of the object, the images being imaged by respective cameras from respective viewpoints, the three-dimensional model including three-dimensional points each of which indicating a position of the object; obtaining a camera parameter of one camera among the respective cameras; generating, based on the camera parameter and the three-dimensional model, a depth image indicating a distance between the one camera and the object; generating a foreground image indicating an area in which the object is present in the one image imaged by the one camera; comparing the depth image and the foreground image to determine whether there is a deficiency of a three-dimensional point in the three-dimensional model; and
(Continued)

outputting deficiency information if it is determined that there is the deficiency of the three-dimensional point in the three-dimensional model.

10 Claims, 13 Drawing Sheets

Related U.S. Application Data

(60) Provisional application No. 62/686,867, filed on Jun. 19, 2018.

(51) Int. Cl.
| | |
|---|---|
| *G06T 7/593* | (2017.01) |
| *G06T 5/50* | (2006.01) |
| *G06T 19/00* | (2011.01) |
| *G06T 7/00* | (2017.01) |
| *G06T 5/00* | (2006.01) |

(52) U.S. Cl.
CPC ............. *G06T 7/593* (2017.01); *G06T 7/97* (2017.01); *G06T 19/003* (2013.01)

(56) References Cited

U.S. PATENT DOCUMENTS

| | | | |
|---|---|---|---|
| 2018/0367787 A1* | 12/2018 | Nakajima | H04N 7/147 |
| 2019/0228563 A1* | 7/2019 | Maeda | G06T 15/20 |
| 2019/0266786 A1* | 8/2019 | Kobayashi | H04N 13/00 |
| 2020/0410754 A1* | 12/2020 | Sugano | G06T 15/04 |

OTHER PUBLICATIONS

Reiji Yunoki et al., "Image Segmentation in a Handheld RGB-D Movie", The Institute of Electronics, Information and Communication Engineers and Information Processing Society of Japan, FIT 2014 (Forum on Information Technology 2014), Aug. 2014, 3rd vol. pp. 67-68 (with English translation).

* cited by examiner

METHOD FOR ANALYZING THREE-DIMENSIONAL MODEL AND DEVICE FOR ANALYZING THREE-DIMENSIONAL MODEL

CROSS REFERENCE TO RELATED APPLICATIONS

This application is a U.S. continuation application of PCT International Patent Application Number PCT/JP2019/024341 filed on Jun. 19, 2019, claiming the benefit of priority of U.S. Provisional Patent Application No. 62/686,867 filed on Jun. 19, 2018, the entire contents of which are hereby incorporated by reference.

BACKGROUND

1. Technical Field

The present disclosure relates to a method for analyzing a three-dimensional model and a device for analyzing a three-dimensional model.

2. Description of the Related Art

As a method of distributing multi-view images, Japanese Unexamined Patent Application Publication No. 2002-165200 discloses the technique of distributing, in response to viewpoint movements, videos captured from a plurality of viewpoints.

In addition, the technique of generating a three-dimensional model of a particular scene using a group of images in which the particular scene is captured by a plurality of calibrated cameras, and generating, using the three-dimensional model, free viewpoint images in which the particular scene is viewed from free viewpoints is known.

SUMMARY

A method for analyzing a three-dimensional model of an object according to an aspect of the present disclosure is a method that includes: obtaining the three-dimensional model generated based on images of the object, the images being imaged by respective cameras from respective viewpoints, the three-dimensional model including three-dimensional points each of which indicating a position of the object; obtaining camera parameters of at least one camera among the respective cameras; generating, based on the camera parameters and the three-dimensional model, a depth image indicating a distance between the at least one camera and the object; generating a foreground image indicating an area in which the object is present in at least one image among the images, the at least one image being imaged by the at least one camera; comparing the depth image and the foreground image to determine whether there is a deficiency of a three-dimensional point in the three-dimensional model; and outputting deficiency information if it is determined that there is the deficiency of the three-dimensional point in the three-dimensional model.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
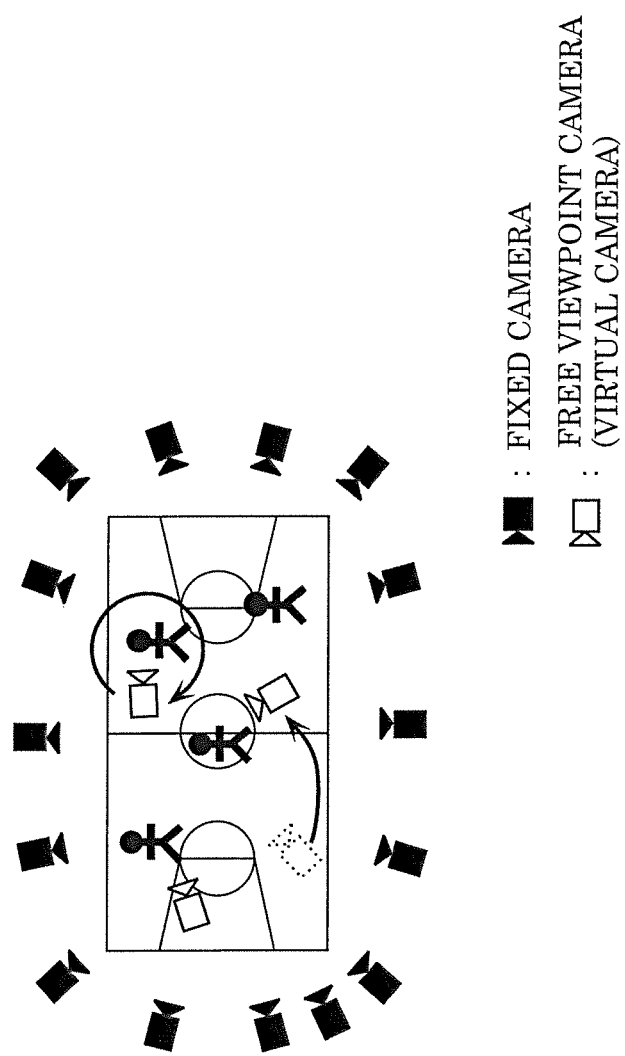
FIG. 1 is a diagram schematically illustrating a free viewpoint image generating system according to an embodiment.

A method for analyzing a three-dimensional model of an object according to an aspect of the present disclosure is a method that includes: obtaining the three-dimensional model generated based on images of the object, the images being imaged by respective cameras from respective viewpoints, the three-dimensional model including three-dimensional points each of which indicating a position of the object; obtaining camera parameters of at least one camera among the respective cameras; generating, based on the camera parameters and the three-dimensional model, a depth image indicating a distance between the at least one camera and the object; generating a foreground image indicating an area in which the object is present in at least one image among the images, the at least one image being imaged by the at least one camera; comparing the depth image and the foreground image to determine whether there is a deficiency of a three-dimensional point in the three-dimensional model; and outputting deficiency information if it is determined that there is the deficiency of the three-dimensional point in the three-dimensional model.

Accordingly, it is possible to notify a user that provided information is generated from a three-dimensional model which includes a deficiency.

In addition, in the comparing, the depth image and the foreground image are converted into binary images, and the binary image of the depth image and the binary image of the foreground image may be compared.

Accordingly, it is possible to readily determine whether there is a deficiency in the three-dimensional model.

In addition, in the outputting, if it is determined that there is the deficiency of the three-dimensional point in the three-dimensional model, a deficient portion in the three-dimensional model may be compensated with a three-dimensional point generated by estimating the deficient portion using the images, and a three-dimensional model obtained by compensating the deficient portion with the three-dimensional point generated may be outputted.

Accordingly, it is possible to provide a user with information that is generated from a three-dimensional model which has been compensated for a deficiency.

In addition, in the outputting, attribute information may be given to the three-dimensional point with which the three-dimensional model is compensated, the attribute information indicating that the three-dimensional point to which the attribute information is given is a three-dimensional point with which the three-dimensional point is compensated, and the deficiency information may be indicated in the attribute information.

Accordingly, deficiency information can be readily given to a deficient portion in a three-dimensional model.

In addition, (i) viewpoint information which indicates at least one of a position or an orientation of a viewpoint relative to the three-dimensional model outputted may be obtained, (ii) a free viewpoint image in which the three-dimensional model is viewed from the viewpoint indicated in the viewpoint information may be generated using the three-dimensional model, the viewpoint information, the camera parameters, and the images, and (iii) when the deficiency information corresponding to the three-dimensional model is obtained, a composite image for displaying the free viewpoint image generated and identification information indicating that the free viewpoint image is generated using a three-dimensional model including a deficiency that is indicated in the deficiency information may be outputted.

Accordingly, by outputting a composite image obtained by combining a free viewpoint image and identification information, it is possible to notify a user that a free viewpoint image is generated from a three-dimensional model which includes a deficiency.

In addition, the identification information may be indicated in an area which corresponds to the deficient portion in the three-dimensional model. The area is displayed in a particular display mode in the free viewpoint image of the composite image.

Accordingly, it is possible to present, to a user, a deficient portion in a free viewpoint image.

In addition, the camera parameters may include a first parameter and a second parameter indicating a position of at least one camera and a camera pose of the at least one camera, respectively.

Furthermore, a foreground image may indicate that the object which is present in the foreground image is a moving object.

Note that these comprehensive or specific aspects of the present disclosure may be realized by a system, a method, an integrated circuit, a computer program, or a computer-readable recording medium such as a CD-ROM, or by any combination or by any optional combination of systems, methods, integrated circuits, computer programs, and recording media.

Hereinafter, embodiments will be described in detail with reference to the drawings. Note that the embodiments described below each show a specific example of the present disclosure. The numerical values, shapes, materials, elements, the arrangement and connection of the elements, steps, order of the steps, etc. indicated in the following embodiments are mere examples, and therefore are not intended to limit the scope of the present disclosure. Therefore, among elements in the following embodiments, those not recited in any one of the broadest, independent claims are described as optional elements.

Embodiment

This embodiment describes a free viewpoint image generating system that is capable of readily generating a free viewpoint image using a multi-view camera and images captured by the multi-view camera.

The use of a plurality of camera images and a free viewpoint image makes it possible to obtain and generate images captured from various directions. This can provide viewers with images (e.g. an image that zoomed in on player A, a crane shot of player A, etc.) that meet diverse needs of the viewers.

FIG. 1 is a diagram schematically illustrating a free viewpoint image generating system. For example, a space can be three-dimensionally reconstructed (three-dimensional space reconstruction) by capturing the space from multiple views using cameras (e.g. fixed cameras) that have been calibrated. By performing tracking, scene analysis, and image rendering using data that is three-dimensionally reconstructed, an image in which a subject is viewed from an optional viewpoint (free viewpoint camera) can be generated. With this, it is possible to realize a next-generation wide-area monitoring system and a free viewpoint image generating system.

In such a free viewpoint image generating system, an appearance of, for example, texture of the subject which is likely to be seen from a specified optional viewpoint can be accurately reproduced by using an area of an image imaged by at least one of the cameras. However, a blind spot or the like which is not captured by any of the cameras may be present when many subjects are present in the image or when occlusion occurs due to a mass of subjects. Since a deficiency in a three-dimensional model occurs when there is an area which is not captured by any of the cameras, there may be cases where it is difficult to provide a user with accurate information.

In generation of a free viewpoint image using a three-dimensional model, a free viewpoint image generating system according to an aspect of the present disclosure determines, in the three-dimensional model, whether there is a portion including a deficiency which is caused by a blind spot or by an inaccurately generated three-dimensional model, and indicates the portion including a deficiency which is determined in the free viewpoint image. With this, it is possible to realize a system that can accurately notify a user of the presence of a portion including a deficiency in a three-dimensional model.

Accordingly, the user can be notified that provided information is generated from a three-dimensional model that includes a deficiency. This makes it possible for the user to determine the presence of a blind spot or the presence of an inaccurate area caused by an inaccurately generated three-dimensional model. This also reduces the possibility of the user obtaining inaccurate information from provided information, such as a free viewpoint image.

Figure 2:
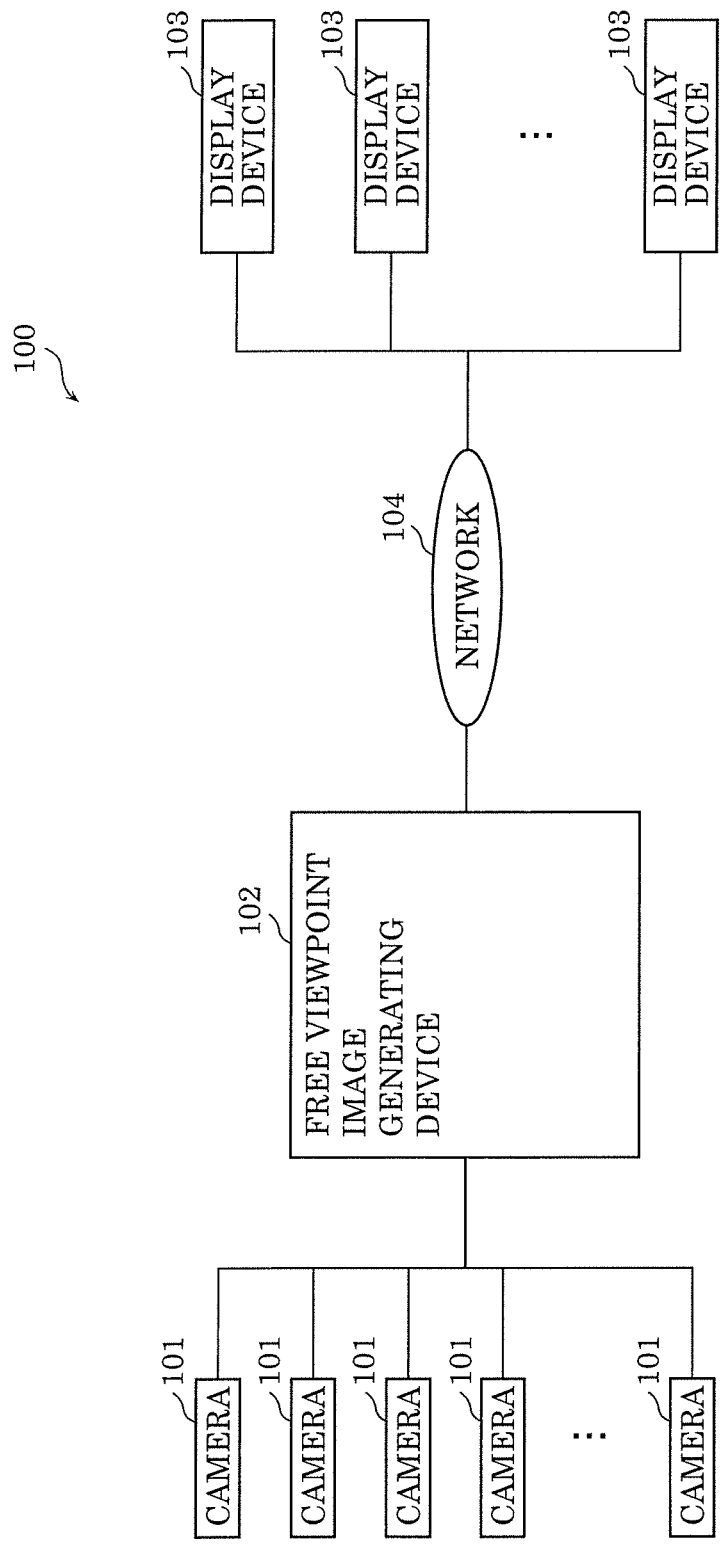
FIG. 2 is a diagram illustrating a configuration of the free viewpoint image generating system according to the embodiment.

Hereinafter, a configuration of free viewpoint image generating system 100 will be described. FIG. 2 is a diagram illustrating a configuration of free viewpoint image generating system 100 according to the embodiment. This free viewpoint image generating system 100 includes a plurality of cameras 101, free viewpoint image generating device 102, and a plurality of display devices 103.

The plurality of cameras 101 generate a plurality of camera images by capturing the same scene from different viewpoints. That is, the plurality of cameras 101 are located in mutually different positions, and image a common three-dimensional space. For example, the plurality of cameras 101 may perform synchronous capturing. Alternatively, the plurality of cameras 101 may embed time information in each camera image, or may add, to each camera image, index information which indicates the order of frames. The plurality of cameras 101 are examples of a plurality of imaging devices.

Free viewpoint image generating device 102 is a server that generates free viewpoint images. Free viewpoint image generating device 102 obtains a plurality of camera images captured by the plurality of cameras 101, and generates a three-dimensional model and a free viewpoint image using the plurality of camera images. In addition, free viewpoint image generating device 102 is connected to the plurality of display devices 103 via network 104. Free viewpoint image generating device 102 transmits the plurality of camera images, the three-dimensional model, and the free viewpoint image to the plurality of display devices 103. Specifically, free viewpoint image generating device 102 generates the three-dimensional model and the free viewpoint image based on time and viewpoint information, and transmits the three-dimensional model and the free viewpoint image to the plurality of display devices 103. In this case, free viewpoint image generating device 102 may generate the free viewpoint image using the three-dimensional model, or may generate the free viewpoint image from two or more images by interpolating an image. Free viewpoint image generating device 102 is an example of a device for analyzing a three-dimensional model.

Display devices 103 are terminals that present a user with camera images, three-dimensional models, and free viewpoint images which are transmitted from free viewpoint image generating device 102 by displaying the camera images, the three-dimensional models, and the free viewpoint images. In addition, display devices 103 select time from the camera images and viewpoints from the three-dimensional models. Then, display devices 103 transmit these items of information to free viewpoint image generating device 102.

Note that a communication method employed for communication between free viewpoint image generating device 102 and display devices 103 is not particularly limited so long as free viewpoint image generating device 102 and display devices 103 can exchange data. For example, free viewpoint image generating device 102 and display devices 103 may communicate via the Internet when free viewpoint image generating device 102 and display devices 103 are located far apart from each other, and may communicate within a local area network (LAN) when free viewpoint image generating device 102 and display devices 103 are located in a laboratory, for example.

Time and a viewpoint required for generating a free viewpoint image in free viewpoint image generating device 102 may be determined in free viewpoint image generating device 102, and may be determined by display device 103 specifying time and a viewpoint.

Figure 3:
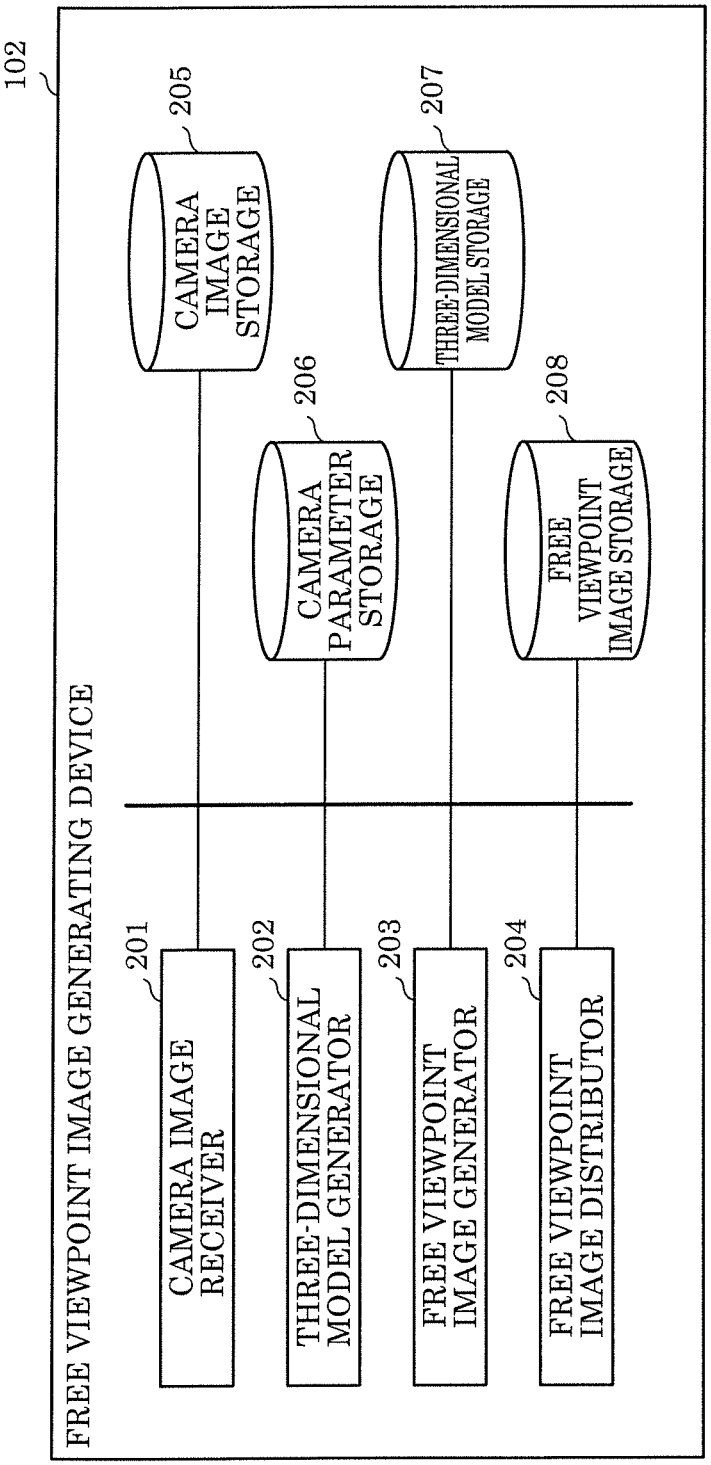
FIG. 3 is a block diagram illustrating a free viewpoint image generating device according to the embodiment.

FIG. 3 is a block diagram illustrating free viewpoint image generating device 102 according to the embodiment. Free viewpoint image generating device 102 includes camera image receiver 201, three-dimensional model generator 202, free viewpoint image generator 203, free viewpoint image distributor 204, camera image storage 205, camera parameter storage 206, three-dimensional model storage 207, and free viewpoint image storage 208.

Camera image receiver 201 obtains a plurality of camera images from one or more cameras 101, and stores the plurality of camera images obtained into camera image storage 205.

Based on time specified by display device 103, three-dimensional model generator 202 generates a three-dimensional model of the time specified using the plurality of camera images stored in camera image storage 205 which have been captured at the time specified and camera parameters stored in camera parameter storage 206. Three-dimensional model generator 202 stores the three-dimensional model generated into three-dimensional model storage 207. For example, three-dimensional model generator 202 generates the three-dimensional model by performing three-dimensional reconstruction using an image processing technique such as Structure from Motion (SfM). Alternatively, when the plurality of camera images each include depth information, three-dimensional model generator 202 generates the three-dimensional model using the depth information.

Based on a viewpoint specified by display device 103, free viewpoint image generator 203 generates a free viewpoint image in which a subject is viewed from the viewpoint. Free viewpoint image generator 203 stores the free viewpoint image generated into free viewpoint image storage 208. For example, free viewpoint image generator 203 generates the free viewpoint image using the three-dimensional model generated by three-dimensional model generator 202. The three-dimensional model used for generating the free viewpoint image may be a three-dimensional model stored in three-dimensional model storage 207. Alternatively, free viewpoint image generator 203 generates the free viewpoint image by interpolating, in two dimensions, an image, in which a subject is viewed from between cameras, between images captured by the cameras as in morphing processing. Note that the free viewpoint image may be a still image or a moving image. The moving image may be a moving image which indicates time series variations of a particular scene that is viewed from a certain viewpoint, and may be a moving image in which the particular scene is viewed from continuously changing viewpoint positions at the time specified. Furthermore, the moving image may be the combination of the above.

Free viewpoint image distributor 204 transmits, to one or more display devices 103, a free viewpoint image generated in free viewpoint image generator 203, or a free viewpoint image stored in free viewpoint image storage 208.

Camera image storage 205 stores camera images captured by camera 101. Specifically, camera image storage 205 stores camera images directly obtained from camera 101. Camera image storage 205 may store camera images indirectly obtained via other devices.

Camera parameter storage 206 stores camera parameters including a three-dimensional position and orientation information (camera pose) of camera 101 that has captured camera images stored in camera image storage 205. The three-dimensional position and the orientation information are obtained by, for example, a global positioning system (GPS) or a gyro sensor included in camera 101. Free viewpoint image generating device 102 may estimate the three-dimensional position and the orientation information, based on a camera image and using an image processing technique such as SfM, and camera parameter storage 206 may store the three-dimensional position and the orientation information which are estimated.

Three-dimensional model storage 207 stores three-dimensional models generated in three-dimensional model generator 202.

Free viewpoint image storage 208 stores free viewpoint images generated in free viewpoint image generator 203.

Note that camera image storage 205, camera parameter storage 206, three-dimensional model storage 207, and free viewpoint image storage 208 are to be able to store each own data temporarily or for a long period of time. Camera image storage 205, camera parameter storage 206, three-dimensional model storage 207, and free viewpoint image storage 208 each may be a short-term storage such as a memory, or a long-term storage such as a hard disk drive (HDD).

Figure 4:
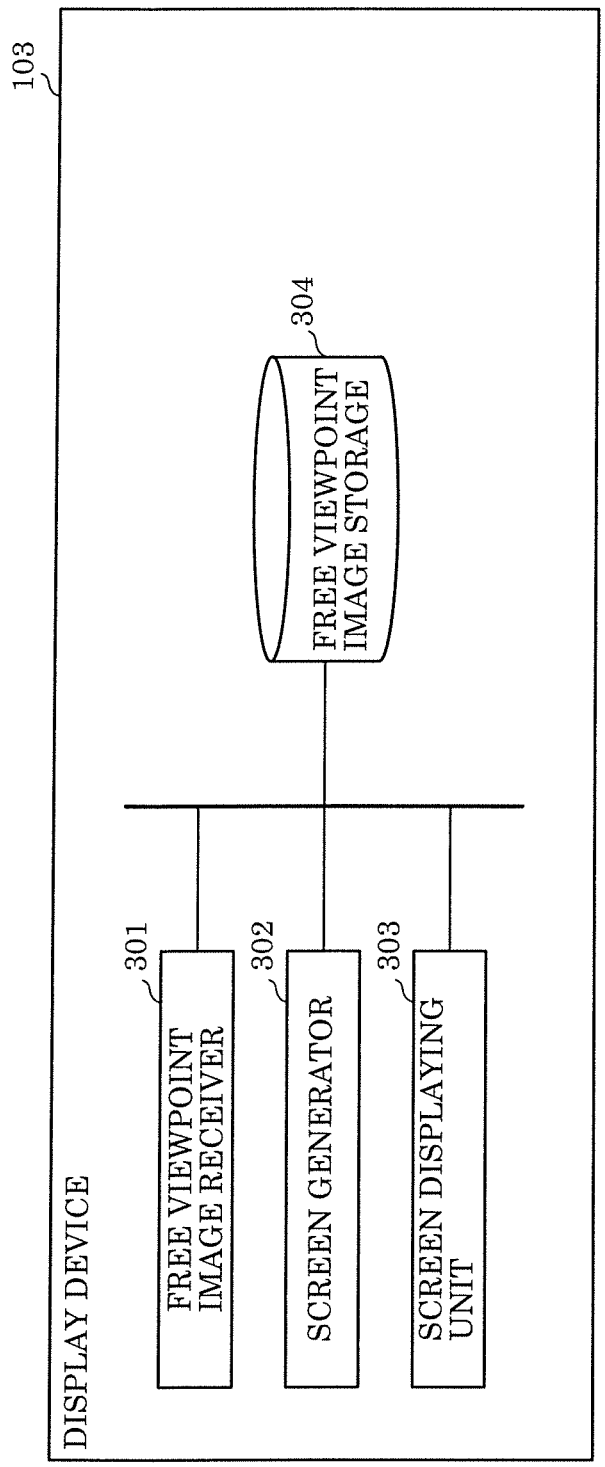
FIG. 4 is a block diagram illustrating a display device according to the embodiment.

FIG. 4 is a block diagram illustrating display device 103 according to the embodiment. Display device 103 includes free viewpoint image receiver 301, screen generator 302, screen displaying unit 303, and free viewpoint image storage 304.

Free viewpoint image receiver 301 receives free viewpoint images generated in free viewpoint image generating device 102, and stores the free viewpoint images received into free viewpoint image storage 304.

Screen generator 302 generates display screens for displaying, on screen displaying unit 303, the free viewpoint images received. In addition, screen generator 302 may obtain operation information, which is a result of receiving operation from a user, and may change a free viewpoint image used for generating a display screen according to the operation information obtained. Note that operation performed by the user is indicated by input to an input device, such as a keyboard and a touch panel.

Screen displaying unit 303 presents users with display screens generated in screen generator 302 by displaying the display screens.

Free viewpoint image storage 304 is a storage which stores free viewpoint images transmitted from free viewpoint image generating device 102.

Note that free viewpoint image storage 304 is to be able to store data temporarily or for a long period of time. Free viewpoint image storage 304 may be a short-term storage such as a memory, or a long-term storage such as an HDD.

Figure 5:
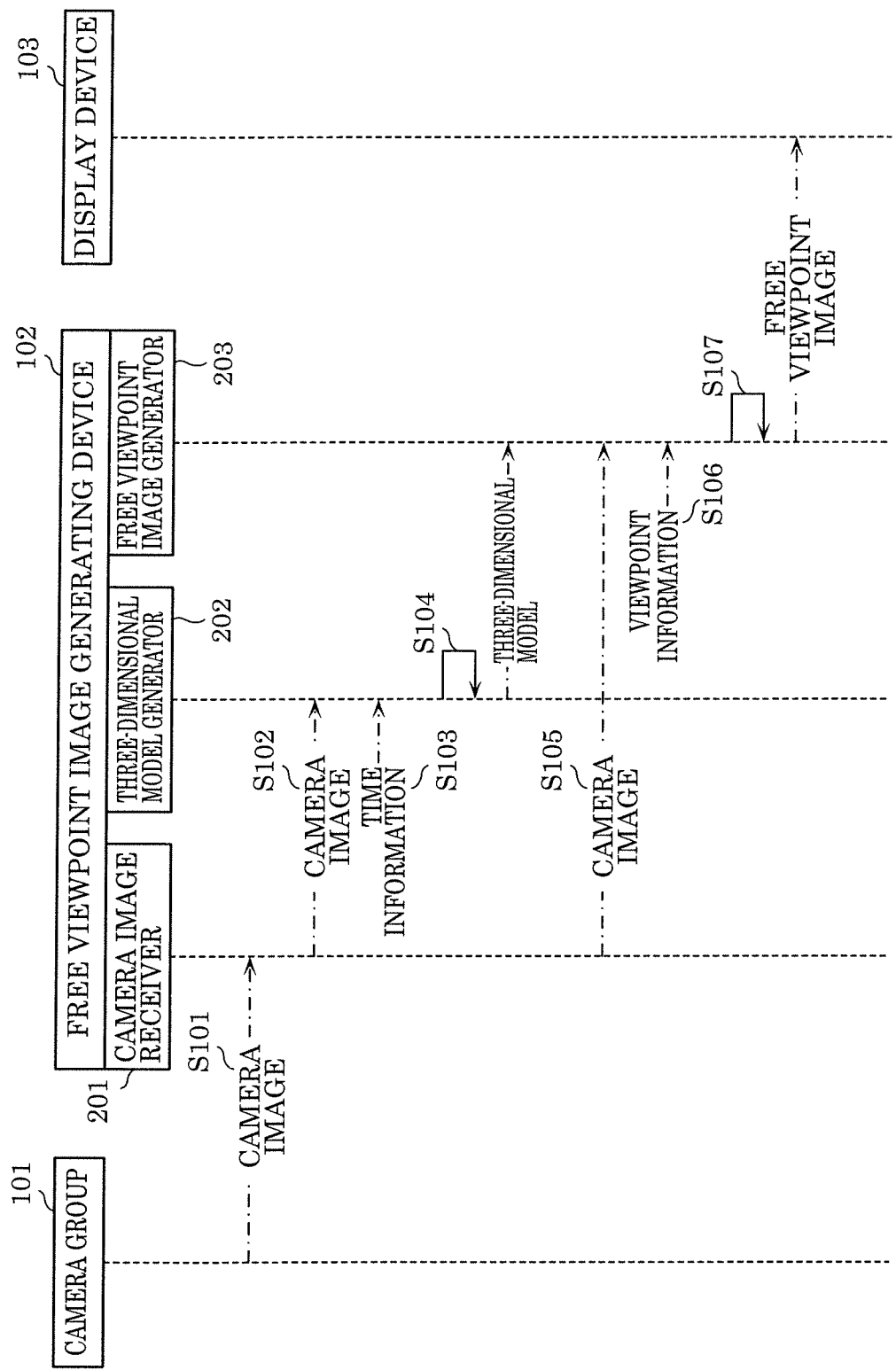
FIG. 5 is a diagram illustrating operations performed in the free viewpoint image generating system according to the embodiment.

Next, operations performed in free viewpoint image generating system 100 according to the embodiment will be described. FIG. 5 is a sequence diagram illustrating operations performed in free viewpoint image generating system 100 according to the embodiment.

First, each of one or more cameras 101 transmits a camera image imaged to free viewpoint image generating device 102 (S101). Note that in FIG. 5, the one or more cameras 101 are indicated as camera group 101. Control relating to imaging of an image, such as starting of recording, which is performed on the one or more cameras 101 may be performed by free viewpoint image generating device 102 or other control devices so long as each of the one or more cameras 101 can transmit a camera image to free viewpoint image generating device 102.

Next, in free viewpoint image generating device 102, camera image receiver 201 outputs a plurality of camera images obtained from the one or more cameras 101 to three-dimensional model generator 202 (S102).

Next, three-dimensional model generator 202 obtains time information (S103). Note that the time information indicates, for example, time specified by display device 103 or by other terminals. In this case, the time information is transmitted from display device 103 or other terminals. In addition, the time information may be received from a user via an input receiver (not illustrated) included in free viewpoint image generating device 102, for example.

Next, three-dimensional model generator 202 generates, based on time indicated in the time information, a three-dimensional model of the time indicated (S104). Three-dimensional model generator 202 outputs the three-dimensional model generated to free viewpoint image generator 203. The processing of generating a three-dimensional model will be described later in detail with reference to FIG. 6.

Next, free viewpoint image generator 203 obtains the plurality of camera images from camera image receiver 201 (S105) and viewpoint information (S106). Note that free viewpoint image generator 203 may obtain the plurality of camera images from camera image storage 205. The viewpoint information is, for example, information which indicates a viewpoint specified by display device 103 or other terminals. In this case, the viewpoint information is transmitted from display device 103 or other terminals. In addition, the viewpoint information may be received from a user via an input receiver (not illustrated) included in free viewpoint image generating device 102, for example.

Next, free viewpoint image generator 203 generates, based on the viewpoint indicated in the viewpoint information obtained and using the three-dimensional model obtained and the plurality of camera images obtained, a free viewpoint image in which a subject is viewed from the viewpoint (S107). Free viewpoint image generator 203 transmits the free viewpoint image generated to display device 103. The processing of generating the free viewpoint image will be described later in detail with reference to FIG. 10.

Figure 6:
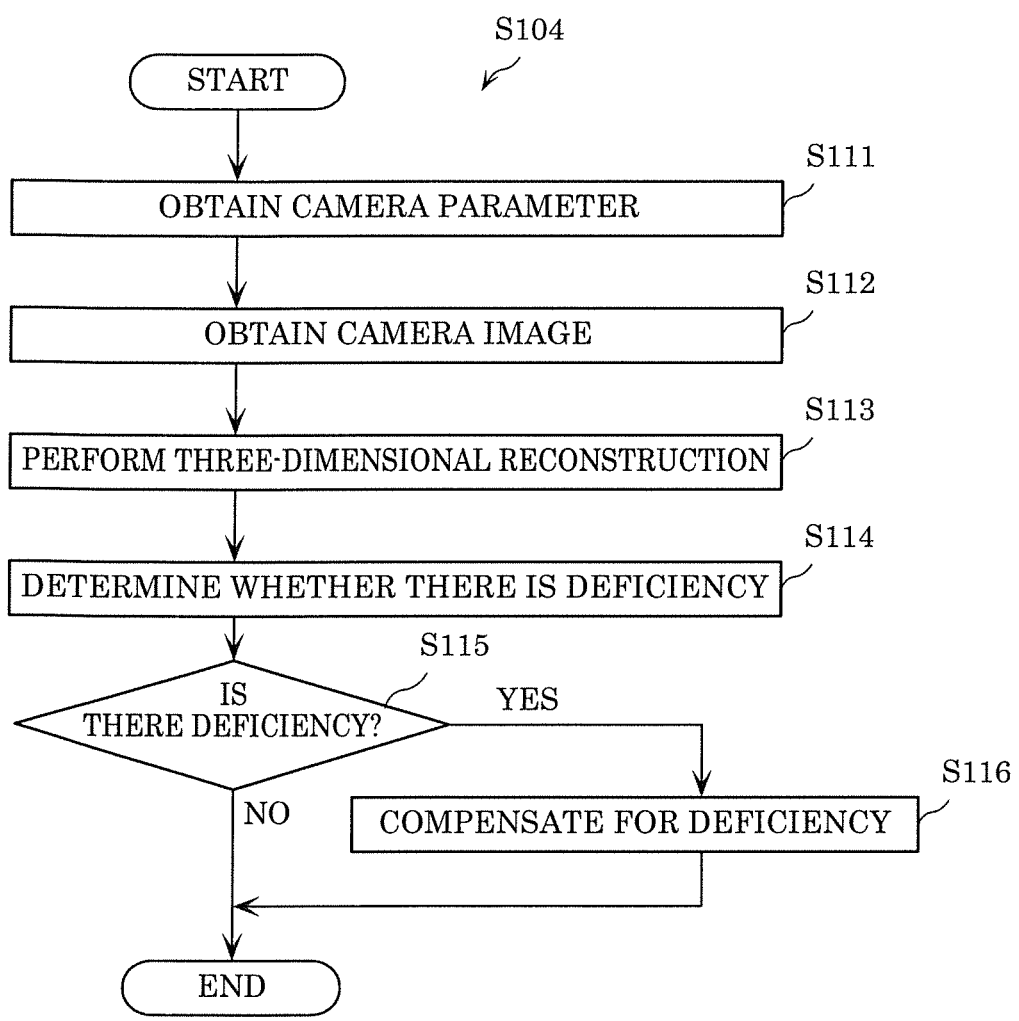
FIG. 6 is a flowchart illustrating processing of generating a three-dimensional model according to the embodiment.

Next, processing of generating a three-dimensional model (S104) will be described. FIG. 6 is a flowchart illustrating processing of generating a three-dimensional model (S104).

First, three-dimensional model generator 202 obtains camera parameters including, for example, a three-dimensional position, an orientation, and lens information of camera 101 from two or more cameras 101 (S111). Three-dimensional model generator 202 obtains the camera parameters from camera parameter storage 206.

Next, three-dimensional model generator 202 obtains a plurality of camera images captured by the two or more cameras 101 (S112). The plurality of camera images obtained at this time include camera images captured by the two or more cameras 101 each of which corresponds to the camera parameters obtained in step S111.

Note that the order of performing step S111 and step S112 are not limited to the order described above. Step S112 may be performed prior to step S111, so long as the combination of camera parameters and a camera image obtained from the same camera can be obtained from two or more cameras 101.

Next, three-dimensional model generator 202 performs three-dimensional reconstruction using the camera parameters obtained in step S111 and the plurality of camera images obtained in step S112, and generates a three-dimensional model (S113). For example, processing such as a shape-from-silhouette method and SfM is performed in the three-dimensional reconstruction.

Next, three-dimensional model generator 202 determines whether there is a deficiency in the three-dimensional model generated in step S113 (S114). The processing of determining whether there is a deficiency will be described later in detail with reference to FIG. 7 and FIG. 8.

Next, if three-dimensional model generator 202 determines that there is a deficiency (YES in S115) in determination of whether there is a deficiency which is performed in step S114, three-dimensional model generator 202 compensates for a deficient portion which is a portion including a deficiency (S116). For the deficient portion included in the three-dimensional model generated in S113, a three-dimensional point is newly generated by performing estimation processing using the plurality of camera images, and processing of compensating the three-dimensional model with the three-dimensional point is performed in the processing of compensating for the deficient portion. Accordingly, three-dimensional model generator 202 regenerates the three-dimensional model that is compensated with the three-dimensional point, and outputs the three-dimensional model regenerated.

If three-dimensional model generator 202 determines that there is no deficiency (NO in S115) in the determination of whether there is a deficiency which is performed in step S114, three-dimensional model generator 202 outputs the three-dimensional model generated in step S113.

Figure 7:
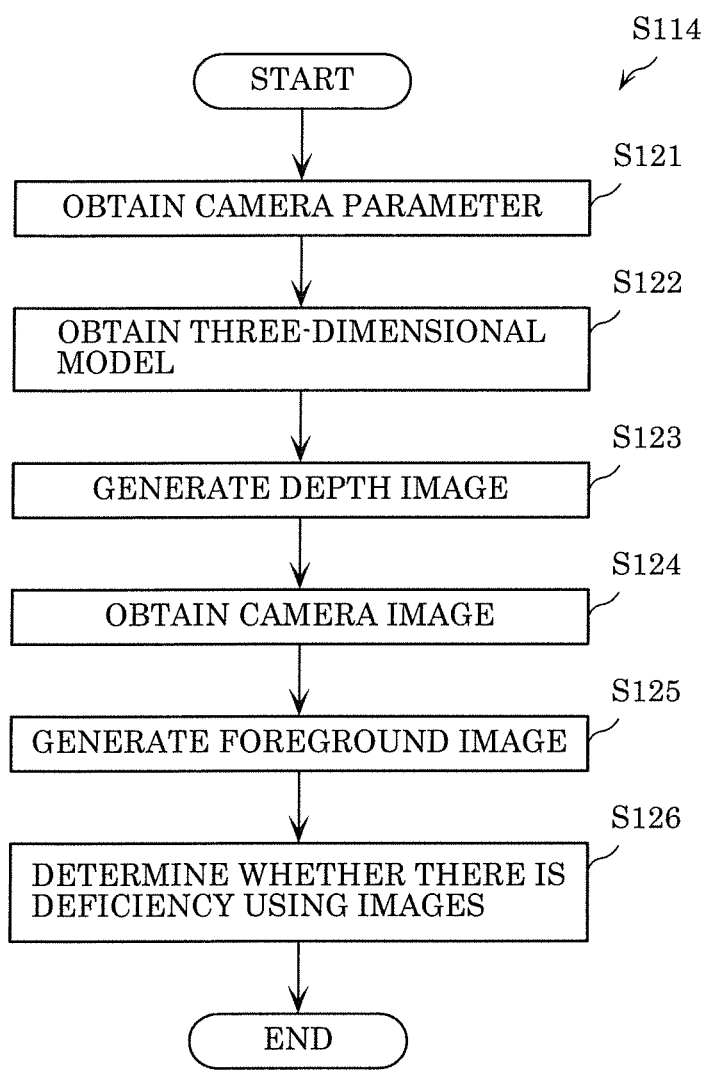
FIG. 7 is a flowchart illustrating processing of determining whether there is a deficiency according to the embodiment.
Figure 8:
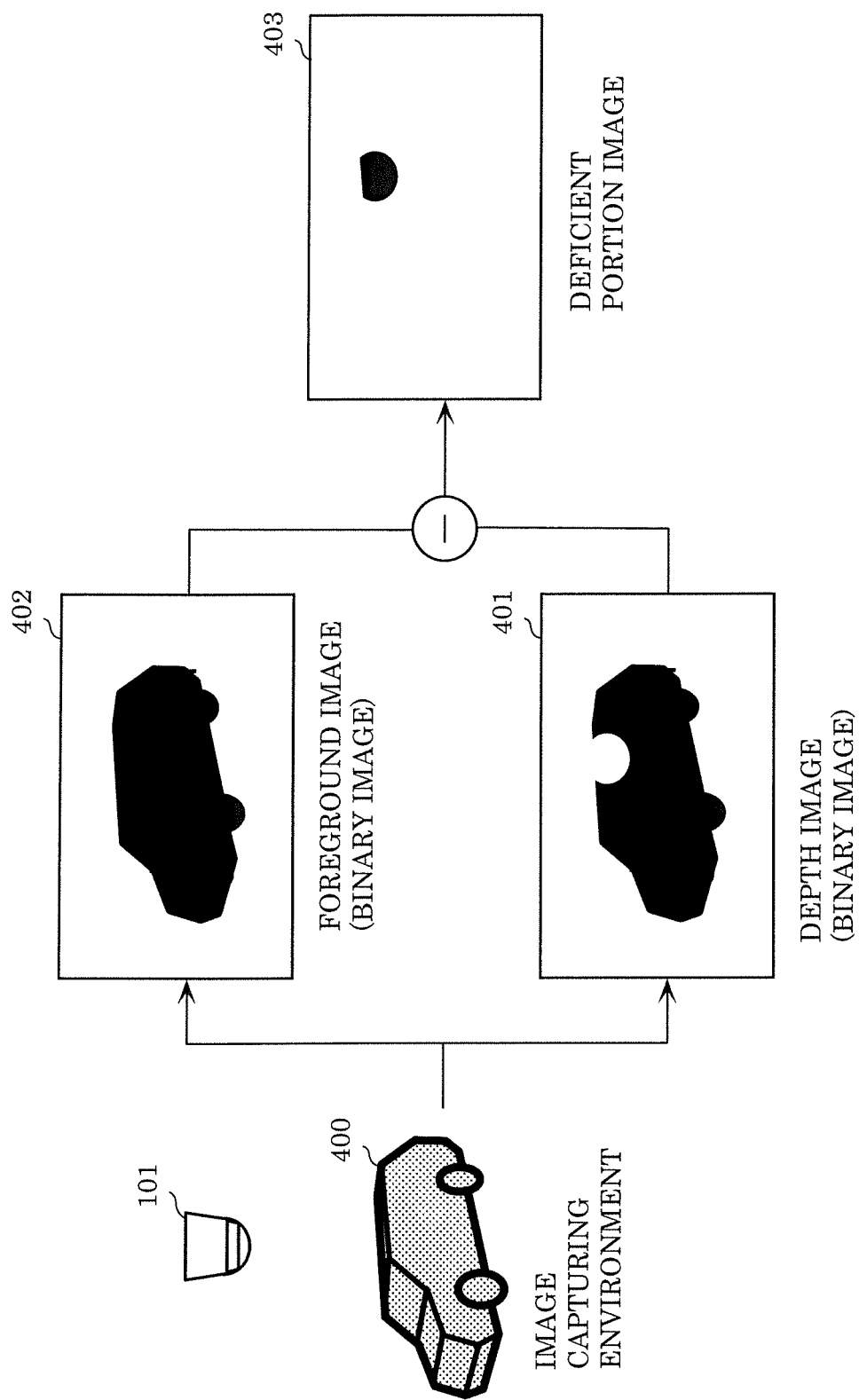
FIG. 8 is a schematic diagram illustrating the processing of determining whether there is a deficiency according to the embodiment.

Next, the processing of determining whether there is a deficiency (S114) will be described. FIG. 7 is a flowchart illustrating processing of determining whether there is a deficiency. FIG. 8 is a schematic diagram illustrating the processing of determining whether there is a deficiency.

First, three-dimensional model generator 202 obtains the camera parameters used for performing the three-dimensional reconstruction in step S113 (S121).

Next, three-dimensional model generator 202 obtains the three-dimensional model generated in step S113 (S122). As illustrated in FIG. 8, the three-dimensional model is generated as a result of imaging subject 400 by a plurality of cameras 101 including one camera 101, for example.

Next, three-dimensional model generator 202 generates a depth image indicating a distance from the one camera 101 to the three-dimensional model, based on the camera parameters and the three-dimensional model obtained in step S121 and in step S122, respectively (S123). Three-dimensional model generator 202 determines an orientation of the one camera 101, based on a camera parameter of the one camera 101, and generates, using the orientation determined and the three-dimensional model, the depth image formed from depth information which indicates the distance between the one camera 101 and the three-dimensional model (subject 400) when subject 400 is viewed from the one camera 101. The depth image includes a plurality of pixels each of which includes, as a pixel value, depth information. The plurality of pixels are arrayed in the same manner as a plurality of pixels in a camera image obtained from the one camera 101. For example, a pixel value of each pixel of the depth image indicates the distance between the one camera 101 and a point on a surface of the three-dimensional model (subject 400). The point on the surface of the three-dimensional model is identified by a pixel that corresponds to a pixel of the camera image obtained by the one camera 101. The pixel value of a pixel of the depth image has a larger value for a larger distance, for example.

Next, three-dimensional model generator 202 obtains the plurality of camera images used for performing the processing of three-dimensional reconstruction in step S113 (S124).

Next, three-dimensional model generator 202 generates, by extracting an area in which an object of interest is present from each of the plurality of camera images obtained in step S124, foreground images in which the area extracted is present (S125). The foreground images each indicate, for example, an image in which a moving object such as a car or a truck driving on a road which is extracted from a camera image obtained by capturing the road is present. The foreground images each are, for example, an image obtained by subtracting a background image from a camera image in which an object is present. The background image in which the object is not present is to be captured in advance as the background image. That is, the foreground image is an image in which the object which is extracted by removing the background image from the camera image is present. Alternatively, the foreground image may be generated by extracting the object using a method of giving a meaning per pixel, which is called semantic segmentation.

Next, three-dimensional model generator 202 determines whether there is a deficiency of a three-dimensional point in the three-dimensional model obtained in step S122, by comparing the depth image generated in step S123 and the foreground images generated in step S125 (S126). For example, as illustrated in FIG. 8, three-dimensional model generator 202 converts each of the depth image and a foreground image into a binary image, and determines whether there is a deficiency of a three-dimensional point in the three-dimensional model by comparing the binary image of depth image 401 and the binary image of foreground image 402.

Note that three-dimensional model generator 202 converts the depth image into a binary image by setting the pixel value of a pixel which is greater than a predetermined threshold as "1", and by setting the pixel value of a pixel which is at least the predetermined threshold as "0". In addition, three-dimensional model generator 202 converts the foreground image into a binary image by setting the pixel value of a pixel which has no pixel value as "1", and by setting the pixel value of a pixel which has a pixel value as "0". Note that values "1" and "0" set for converting each of the depth image and the foreground image into a binary image may be set oppositely from the above.

Specifically, three-dimensional model generator 202 obtains a result of subtraction by subtracting the binary image of depth image 401 from the binary image of foreground image 402. When deficient portion image 403 which includes at least a predetermined number of pixels each of which having a pixel value is obtained as a result of the subtraction, three-dimensional model generator 202 determines that there is a deficiency of a three-dimensional point in the three-dimensional model. When the number of pixels each of which having a pixel value is less than the predetermined number in an image obtained as a result of the subtraction, three-dimensional model generator 202 determines that there is no deficiency of a three-dimensional point in the three-dimensional model.

The above has described that three-dimensional model generator 202 determines whether there is a deficiency of a three-dimensional point in a three-dimensional model by converting each of a depth image and a foreground image into a binary image, and comparing the binary image of the depth image and the binary image of the foreground image. However, the determination need not use the binary image of the depth image and the binary image of the foreground image. For example, three-dimensional model generator 202 may determine whether there is a deficiency of a three-dimensional point in a three-dimensional model by converting a foreground image into a grayscale image or into a binary image according to the range of pixel values of a depth image, and by comparing the binary image or the grayscale image of the depth image and the binary image or the grayscale image of the foreground image. In this case, three-dimensional model generator 202 determines that there is a deficiency of a three-dimensional point in a three-dimensional model if a deficient portion image, which includes at least a predetermined number of pixels each of which having a pixel value that is greater than a predetermined pixel value, is obtained as a result of subtraction. Three-dimensional model generator 202 determines that there is no deficiency of a three-dimensional point in the three-dimensional model if the number of pixels each of which having a pixel value that is greater than a predetermined pixel value is less than a predetermined number.

Figure 9:
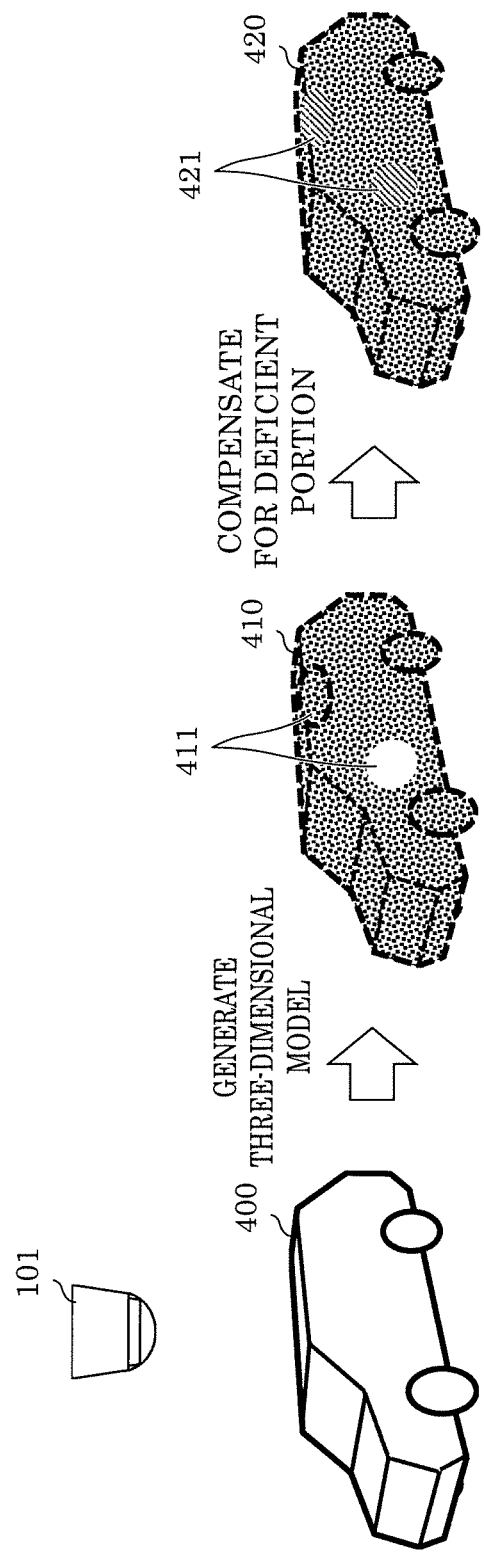
FIG. 9 is a schematic diagram illustrating processing of compensating for a deficient portion according to the embodiment.

Next, processing of compensating for a deficient portion (S116) will be described in detail. FIG. 9 is a schematic diagram illustrating processing of compensating for a deficient portion.

For example, as illustrated in FIG. 9, three-dimensional model generator 202 performs the three-dimensional reconstruction processing performed in step S113. With this, three-dimensional model generator 202 generates three-dimensional model 410, using a plurality of camera images in each of which subject 400 is present and which are imaged by a plurality of cameras 101, and camera parameters of the plurality of cameras 101. When three-dimensional model generator 202 determines that there are deficient portions 411 in three-dimensional model 410 generated in the processing of determining whether there is a deficiency which is performed in step S114, three-dimensional model generator 202 compensates for deficient portions 411, by performing estimation processing using three-dimensional information on an area surrounding each of deficient portions 411. Three-dimensional model generator 202 may newly generate, for each of deficient portions 411, a three-dimensional point by loosening a constraint imposed on matching of feature points (e.g. normalized cross correlation (NCC)) for generating a three-dimensional point when camera images imaged by the plurality of cameras 101 are used, and may compensate for each of deficient portions 411 with the three-dimensional point that is newly generated. Accordingly, three-dimensional model generator 202 newly generates three-dimensional model 420 that has been compensated for deficient portions 411 and includes compensated portions 421, and outputs three-dimensional model 420 that is newly generated. Compensated portions 421 each include a three-dimensional point generated by newly performing estimation using the plurality of camera images.

In addition, when an attribute can be set in each of areas of a three-dimensional model, information indicating whether an area has been compensated may be added as an attribute of each area. Furthermore, as attribute information, information indicating that the area has been compensated may be added to the area that has been compensated. For example, when a three-dimensional model includes a point cloud which is a set of a plurality of three-dimensional points, and when each of the plurality of three-dimensional points has attribute information, such as a color and reflectance of the three-dimensional point other than information indicating a position of the three-dimensional point, information indicating that the three-dimensional point is a three-dimensional point with which the three-dimensional model is compensated may be given to, as attribute information, the three-dimensional point which is newly generated for compensating the three-dimensional model.

As such, three-dimensional model generator 202 outputs deficiency information indicating that there is a deficiency of a three-dimensional point in a three-dimensional model when there is a deficiency of a three-dimensional point in the three-dimensional model generated. The deficiency information may be information given to the three-dimensional model itself, or may be attribute information given to each three-dimensional point with which the three-dimensional model is compensated as described above, for example. In addition, when there is a deficiency of a three-dimensional point in the three-dimensional model, three-dimensional model generator 202 may give the deficiency information indicating that there is a deficiency to the three-dimensional model, and may output the three-dimensional model to which the deficiency information is given.

Figure 10:
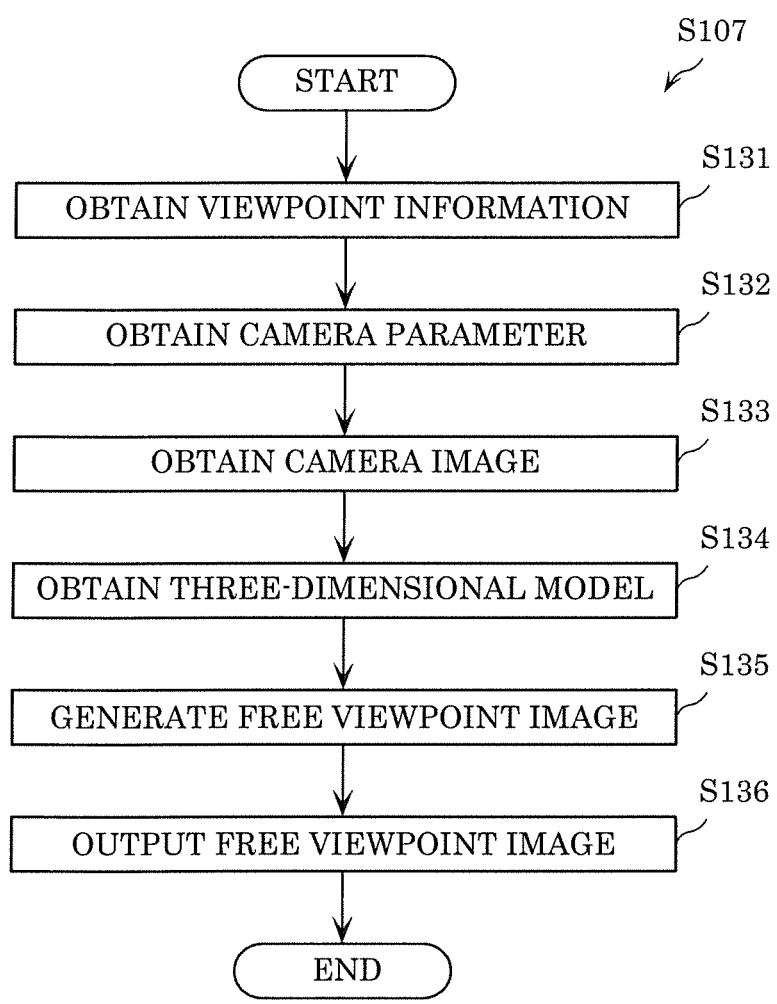
FIG. 10 is a flowchart illustrating processing of generating a free viewpoint image according to the embodiment.
Figure 11:
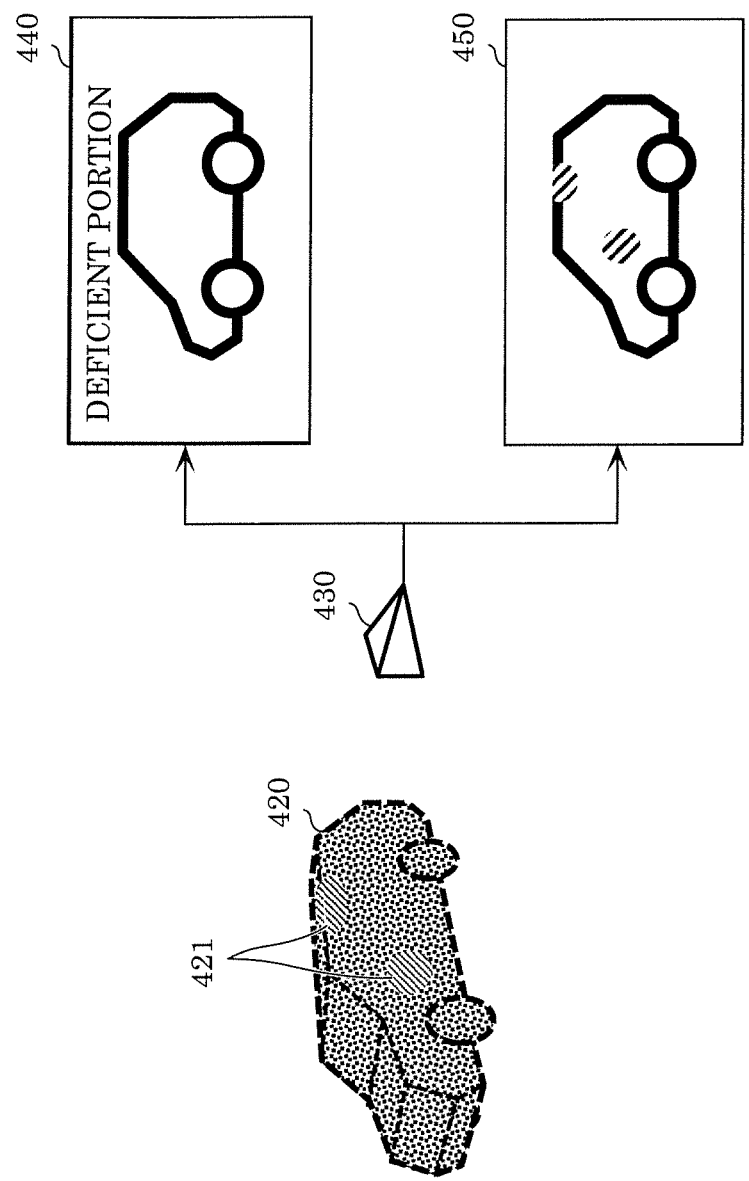
FIG. 11 is a schematic diagram illustrating processing of generating the free viewpoint image according to the embodiment.

Next, processing of generating a free viewpoint image (S107) will be described in detail. FIG. 10 is a flowchart illustrating processing of generating a free viewpoint image (S107). FIG. 11 is a schematic diagram illustrating processing of generating a free viewpoint image.

First, free viewpoint image generator 203 obtains viewpoint information which indicates at least one of a three-dimensional position of a viewpoint and a direction of a line of sight of the viewpoint which are used for generating a free viewpoint image (S131).

Next, free viewpoint image generator 203 obtains camera parameters including, for example, a three-dimensional position, an orientation, and lens information of camera 101 from two or more cameras 101 (S132). Free viewpoint image generator 203 obtains camera parameters of the two or more cameras 101 from camera parameter storage 206.

Next, free viewpoint image generator 203 obtains a camera image captured by camera 101 from the two or more cameras 101 (S133). The camera images obtained at this time include camera images which are captured by the two or more cameras 101 and each of which corresponds to the camera parameters obtained in step S132.

Next, free viewpoint image generator 203 obtains the three-dimensional model generated in step S104 (S134).

Next, free viewpoint image generator 203 generates a free viewpoint image in which the three-dimensional model obtained in step S134 is viewed from a viewpoint indicated in the viewpoint information obtained in step S131 using the camera parameters and the camera images obtained in step S132 and step S133, respectively (S135). Note that as illustrated in FIG. 11, free viewpoint image generator 203 generates free viewpoint images 440 and 450 by projecting three-dimensional model 420 in a three-dimensional space onto viewpoint 430 which is indicated in the viewpoint information, for example.

Here, free viewpoint image generator 203 may indicate an area that is determined as a deficient portion in the free viewpoint images. For example, free viewpoint image generator 203 may generate free viewpoint image 440 in which a deficient portion present is indicated by displaying a caption indicating the presence of the deficient portion, or by displaying the image frame in a color different from the color of an image frame of a free viewpoint image generated from a three-dimensional model in which no deficient portion is present. In addition, free viewpoint image generator 203 may generate free viewpoint image 450 in which areas of deficient portions are represented by a particular color or by a particular pattern, for example. Furthermore, an object in which a deficient portion is present may be indicated in a free viewpoint image. Note that so long as a free viewpoint image is presented to a user in such a way that the user can recognize that the viewpoint image is generated from a three-dimensional model in which a deficient portion is present, the means of presenting the free viewpoint image are not limited to the above, and the free viewpoint image can be presented by any means.

That is, when free viewpoint image generator 203 obtains deficiency information corresponding to the three-dimensional model, free viewpoint image generator 203 outputs a composite image for displaying a free viewpoint image generated, and identification information indicating that the free viewpoint image is generated using the three-dimensional model including a deficiency that is indicated in the deficiency information. For example, in free viewpoint image 450 as a composite image, the identification information is indicated in an area which corresponds to a deficient portion in the three-dimensional model and is displayed in a particular display mode in the free viewpoint image.

Finally, free viewpoint image generator 203 outputs free viewpoint image 440 or free viewpoint image 450 generated in step S135 to display device 103 (S136).

Free viewpoint image generating system 100 according to the embodiment determines whether there is a deficiency of a three-dimensional point in a three-dimensional model, by comparing a depth image and a foreground image, and outputs deficiency information indicating that there is a deficiency of a three-dimensional point in the three-dimensional model if there is a deficiency of a three-dimensional point in the three-dimensional model. Therefore, a user can be notified that provided information is generated from a three-dimensional model which includes a deficiency.

In addition, in the processing of determining whether there is a deficiency, free viewpoint image generating system 100 converts each of the depth image and the foreground image into a binary image, and determines whether there is a deficiency of a three-dimensional point in the three-dimensional model by comparing the binary image of the depth image and the binary image of the foreground image. Therefore, it is possible to readily determine whether there is a deficiency in the three-dimensional model.

Furthermore, in the outputting of a three-dimensional model, free viewpoint image generating system 100 compensates the three-dimensional model for a deficient portion present in the three-dimensional model with a three-dimensional point generated by estimation performed using a plurality of camera images, when there is a deficiency of the three-dimensional point in the three-dimensional model, and outputs the three-dimensional model obtained by compensating the deficient portion with the three-dimensional point. Therefore, it is possible to provide a user with information that is generated from a three-dimensional model that has been compensated for a deficiency.

In addition, when free viewpoint image generating system 100 obtains deficiency information corresponding to the three-dimensional model, free viewpoint image generating system 100 outputs a composite image for displaying a free viewpoint image generated and identification information indicating that the free viewpoint image is generated using the three-dimensional model including a deficiency which is indicated in the deficiency information. Accordingly, it is possible for a user to be notified that the free viewpoint image is generated from a three-dimensional model including a deficiency by outputting the composite image obtained by combining the free viewpoint image and the identification information.

Furthermore, the identification information is indicated in an area which corresponds to a deficient portion in the three-dimensional model and is displayed in a particular display mode in the free viewpoint image of the composite image. With this, it is possible to present a deficient portion in the free viewpoint image to a user.

Variation

Next, a variation will be described.

The above embodiment has described that three-dimensional model generator 202 determines whether there is a deficient portion, but whether there is a deficient portion may be determined by free viewpoint image generator 203. That is, step S104a, which will be described with reference to FIG. 12, may be performed instead of step S104 which is performed by three-dimensional model generator 202. In addition, step S107a, which will be described with reference to FIG. 13, may be performed instead of step S107 which is performed by free viewpoint image generator 203.

Figure 12:
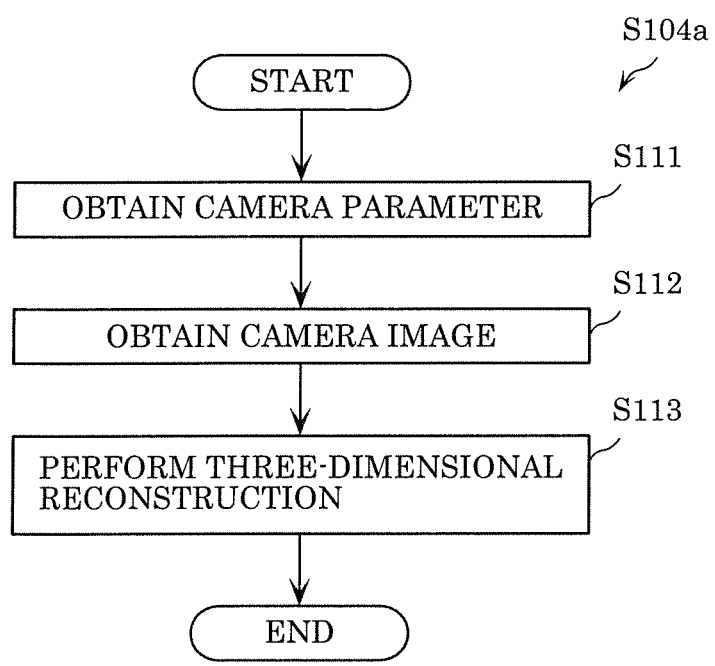
FIG. 12 is a flowchart illustrating processing of generating a three-dimensional model according to a variation.

FIG. 12 is a flowchart illustrating processing of generating a three-dimensional model (S104a) according to a variation.

As illustrated in FIG. 12, the processing identical to steps S111 through S113 which are illustrated in FIG. 6 is performed in the processing of generating a three-dimensional model according to the variation, and a three-dimensional model generated in step S113 is outputted.

In the processing of generating a three-dimensional model according to the variation, the difference from the flowchart illustrated in FIG. 6 is that a three-dimensional model which is finally outputted from three-dimensional model generator 202 does not include information about a deficient portion. This can reduce the amount of processing required for the processing of generating a three-dimensional model, and can generate a three-dimensional model at high speed.

Figure 13:
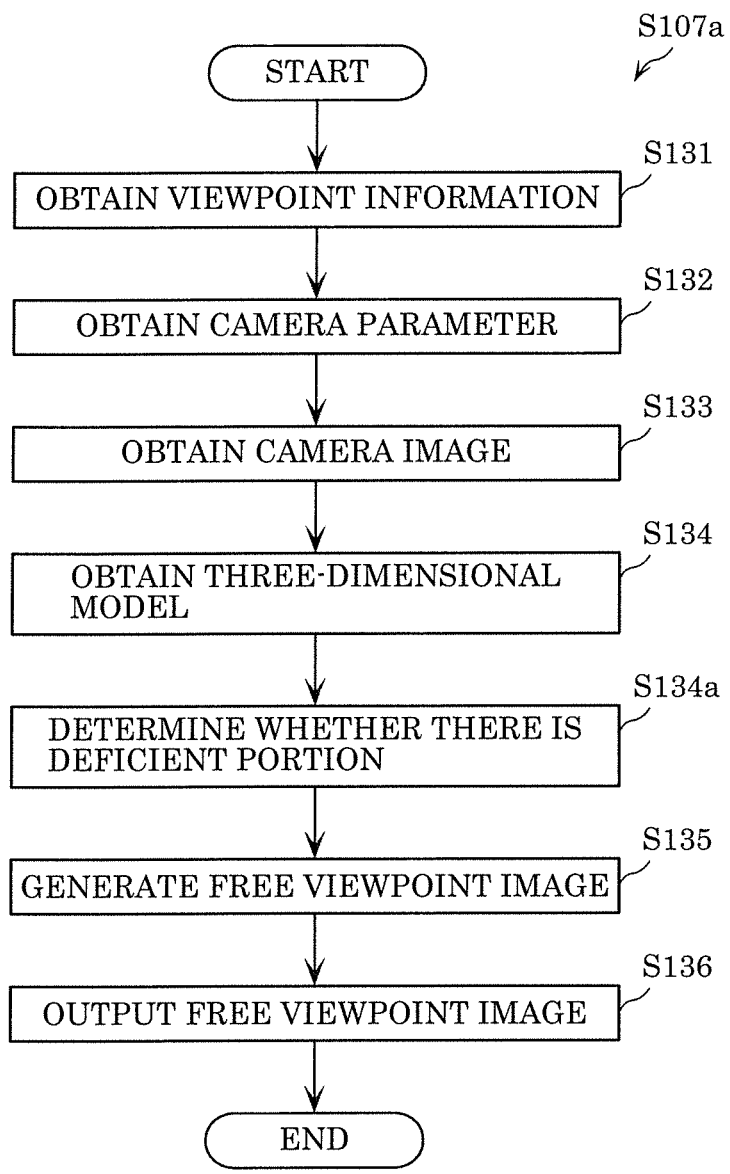
FIG. 13 is a flowchart illustrating processing of generating a free viewpoint image according to the variation.

FIG. 13 is a flowchart illustrating processing of generating a free viewpoint image (S107a) according to the variation.

As illustrated in FIG. 13, the processing identical to steps S131 through S134 which are illustrated in FIG. 10 is performed in the processing of generating a three-dimensional model according to the variation.

Next, free viewpoint image generator 203 determines whether there is a deficiency in the three-dimensional model obtained in step S134 (S134a). Here, in the processing of determining whether there is a deficiency, the processing identical to step S114 is performed, for example. However, even when it is determined that there is a deficiency, the processing of compensating for a deficient portion as in step S116 is not performed. Instead, free viewpoint image generator 203 outputs deficiency information indicating that there is a deficient portion to each of the camera images obtained in step S133.

Next, free viewpoint image generator 203 generates a free viewpoint image in which the three-dimensional model obtained in step S134 is viewed from a viewpoint indicated in the viewpoint information obtained in step S131, using the camera parameters and the camera images obtained in step S132 and step S133, respectively (S135). Note that free viewpoint image generator 203 generates the free viewpoint image by projecting three-dimensional model 420 in a three-dimensional space onto the viewpoint indicated in the viewpoint information, for example. At this time, free viewpoint image generator 203 determines, based on the deficiency information, an area in which a deficient portion is present, and within the free viewpoint image, sets an area which is generated using pixel values of the area in which the deficient portion is present as a deficient area. The deficient area may be illustrated in the same manner as diagonally-hatched areas in free viewpoint image 450 which is illustrated in FIG. 11, for example.

Finally, free viewpoint image generator 203 outputs free viewpoint image 440 or free viewpoint image 450 which is generated in step S135 to display device 103 (S136).

The amount of calculation required for the processing of generating a three-dimensional model according to the variation and for the processing of generating a free viewpoint image according to the variation is reduced since it is not necessary to perform the processing of compensating the three-dimensional model.

In addition, the variation describes a method for analyzing a three-dimensional model in which a three-dimensional model is generated using a plurality of images obtained from a plurality of imaging devices which are located in mutually different positions and capture a common three-dimensional space. When there is a deficiency of a three-dimensional point in the three-dimensional model, deficiency information indicating that there is a deficiency of a three-dimensional point in the three-dimensional model may be outputted.

The foregoing has described the free viewpoint image generating system according to embodiments of the present disclosure, yet the present disclosure is not limited to these embodiments.

In addition, each of processors included in the free viewpoint generating system according to the above embodiments are typically realized as a large-scale integration (LSI) circuit, which is an integrated circuit. These circuits each may be individually realized as a single chip or may be realized as a single chip including some or all of the circuits.

Circuit integration is not limited to LSI; the circuit integration may be realized as a dedicated circuit or a general-purpose processor. A field programmable gate array (FPGA) that is programmable after manufacturing of the LSI circuit, or a reconfigurable processor whose circuit cell connections and settings in the LSI circuit are reconfigurable, may be used.

Furthermore, in the above embodiments, each of the structural elements may be configured as dedicated hardware or may be realized by executing a software program suitable for each structural element. Each structural element may be realized as a result of a program execution unit, such as a CPU, a processor, or the like, loading and executing a software program stored in a storage medium such as a hard disk or a semiconductor memory.

In addition, the present disclosure may be realized as a free viewpoint image generating system, a free viewpoint image generating device, or various methods, such as a free viewpoint image generating method performed by a display device or a free viewpoint image displaying method performed by a display device.

Furthermore, each of the block diagrams illustrates one example of the division of functional blocks. The plurality of functional blocks may be realized as a single functional block, a single functional block may be broken up into a plurality of functional blocks, and part of one function may be transferred to another functional block. Moreover, the functions of a plurality of function blocks having similar functions may be processed by a single piece of hardware or software in parallel or by time-division.

In addition, the order in which the steps are executed in the flowcharts are mere examples for presenting specific examples of the present disclosure; the orders are not limited to the illustrated orders. Furthermore, some of the steps may be executed at the same time as (in parallel with) other steps.

Hereinbefore, a free viewpoint image generating system according to one or more aspects of the present disclosure has been described based on embodiments, but the present disclosure is not limited to these embodiments. Without departing from the scope of the present disclosure, various modifications which may be conceived by a person skilled in the art, and embodiments achieved by combining structural elements in different embodiments may be encompassed within the scope of one or more aspects the present disclosure.

INDUSTRIAL APPLICABILITY

The present disclosure is useful for a method for analyzing a three-dimensional model, a device for analyzing a three-dimensional model, and the like which can notify a user that information provided is generated from a three-dimensional model which includes a deficiency.

What is claimed is:

1. A method for analyzing a three-dimensional model of an object, the method comprising:
  obtaining the three-dimensional model generated based on images of the object, the images being imaged by respective cameras from respective viewpoints, the three-dimensional model including three-dimensional points each of which indicating a position of the object;
  obtaining camera parameters of at least one camera among the respective cameras;
  generating, based on the camera parameters and the three-dimensional model, a depth image indicating a distance between the at least one camera and the object;
  generating a foreground image by extracting an area in which the object is present in at least one image among the images, the at least one image being imaged by the at least one camera;
  comparing the depth image and the foreground image to determine whether there is a deficiency of a three-dimensional point in the three-dimensional model; and
  outputting deficiency information if it is determined that there is the deficiency of the three-dimensional point in the three-dimensional model,
  wherein a viewpoint of the depth image is the same as a viewpoint of the foreground image.

2. The method according to claim 1, wherein
  in the comparing, the depth image and the foreground image are converted into binary images, and the binary image of the depth image and the binary image of the foreground image are compared.

3. The method according to claim 1, wherein
  in the outputting, if it is determined that there is the deficiency of the three-dimensional point in the three-dimensional model, a deficient portion in the three-dimensional model is compensated with a three-dimensional point generated by estimating the deficient portion using the images, and a three-dimensional model obtained by compensating the deficient portion with the three-dimensional point generated is outputted.

4. The method according to claim 3, wherein
  in the outputting, attribute information is given to the three-dimensional point with which the three-dimensional model is compensated, the attribute information indicating that the three-dimensional point to which the attribute information is given is a three-dimensional point with which the three-dimensional point is compensated, and
  the deficiency information is indicated in the attribute information.

5. The method according to claim 1, further comprising:
  obtaining viewpoint information which indicates at least one of a position or an orientation of a viewpoint relative to the three-dimensional model outputted;
  generating, using the three-dimensional model, the viewpoint information, the camera parameters, and the images, a free viewpoint image in which the three-dimensional model is viewed from the viewpoint indicated in the viewpoint information; and when the deficiency information corresponding to the three-dimensional model is obtained, outputting a composite image for displaying the free viewpoint image generated and identification information indicating that the free viewpoint image is generated using a three-dimensional model including a deficiency, the deficiency being indicated in the deficiency information.

6. The method according to claim 5, wherein
the identification information is indicated in an area which corresponds to the deficient portion in the three-dimensional model, the area being displayed in a particular display mode in the free viewpoint image of the composite image.

7. The method according to claim 1, wherein
the camera parameters include a first parameter and a second parameter indicating a position of the at least one camera and a camera pose of the at least one camera, respectively.

8. The method according to claim 1, wherein
the foreground image indicates that the object present in the foreground image is a moving object.

9. A device for analyzing a three-dimensional model of an object, the device comprising:
a processor; and
memory, wherein
using the memory, the processor:
    obtains the three-dimensional model generated based on images of the object, the images being imaged by respective cameras from respective viewpoints, the three-dimensional model including three-dimensional points each of which indicating a position of the object;
    obtains camera parameters of at least one camera among the respective cameras;
    generates, based on the camera parameters and the three-dimensional model, a depth image indicating a distance between the at least one camera and the object;
    generates a foreground image by extracting an area in which the object is present in at least one image among the images, the at least one image being imaged by the at least one camera;
    compares the depth image and the foreground image to determine whether there is a deficiency of a three-dimensional point in the three-dimensional model; and
    outputs deficiency information if it is determined that there is the deficiency of the three-dimensional point in the three-dimensional model,
    wherein a viewpoint of the depth image is the same as a viewpoint of the foreground image.

10. A non-transitory computer-readable recording medium for use in a computer, the recording medium having a computer program recorded thereon for causing the computer to execute a method for analyzing a three-dimensional model of an object, wherein the method for analyzing the three-dimensional model which is recorded on the recording medium comprises:
    obtaining the three-dimensional model generated based on images of the object, the images being imaged by respective cameras from respective viewpoints, the three-dimensional model including three-dimensional points each of which indicating a position of the object;
    obtaining camera parameters of at least one camera among the respective cameras;
    generating, based on the camera parameters and the three-dimensional model, a depth image indicating a distance between the at least one camera and the object;
    generating a foreground image by extracting an area in which the object is present in at least one image among the images, the at least one image being imaged by the at least one camera;
    comparing the depth image and the foreground image to determine whether there is a deficiency of a three-dimensional point in the three-dimensional model; and
    outputting deficiency information if it is determined that there is the deficiency of the three-dimensional point in the three-dimensional model,
    wherein a viewpoint of the depth image is the same as a viewpoint of the foreground image.

* * * * *